US009851785B2

(12) United States Patent
Spencer-Harper et al.

(10) Patent No.: US 9,851,785 B2
(45) Date of Patent: Dec. 26, 2017

(54) GESTURE MANAGEMENT SYSTEM

(71) Applicant: Palantir Technologies, Inc., Palo Alto, CA (US)

(72) Inventors: Quentin Spencer-Harper, Oxfordshire (GB); Benjamin Adam Duffield, Gloucestershire (GB)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/448,302

(22) Filed: Mar. 2, 2017

(65) Prior Publication Data
US 2017/0177074 A1 Jun. 22, 2017

Related U.S. Application Data

(63) Continuation of application No. 13/557,100, filed on Jul. 24, 2012, now Pat. No. 9,606,647.

(51) Int. Cl.
*G06F 3/033* (2013.01)
*G06F 3/01* (2006.01)
*G06F 3/0482* (2013.01)

(52) U.S. Cl.
CPC ............ *G06F 3/011* (2013.01); *G06F 3/0482* (2013.01)

(58) Field of Classification Search
CPC .. G06F 3/0488; G06F 3/04883; G06F 3/0416; G06F 3/0482; G06F 3/04886; G06F 2203/04808; G06F 3/017
See application file for complete search history.

(56) References Cited

U.S. PATENT DOCUMENTS 5,670,987 A * 9/1997 Doi ........................ B25J 9/1692
345/156
8,418,085 B2 * 4/2013 Snook ..................... G06F 3/017
715/707

* cited by examiner

*Primary Examiner* — Di Xiao
(74) *Attorney, Agent, or Firm* — Hickman Palermo Becker Bingham LLP

(57) ABSTRACT

For storing gesture definitions and evaluating expressions that reference the gesture definitions, an expression evaluation engine evaluates the expressions to determine whether movements of a user satisfy the expressions. The expression evaluation engine receives expressions in user or application requests, or the expression evaluation engine may automatically evaluate the expressions when a gesture recognition system receives updated information about tracked body parts of the user. An expression includes a logical operator that relates different conditions to each other, and the different conditions may reference different gestures or other criteria that are based on the tracked body parts of the user. The expression is satisfied when the logical operator is satisfied. If an expression is satisfied, the expression evaluation engine triggers an action associated with a corresponding gesture definition. An example gesture may trigger display and navigation of a pie menu.

11 Claims, 8 Drawing Sheets

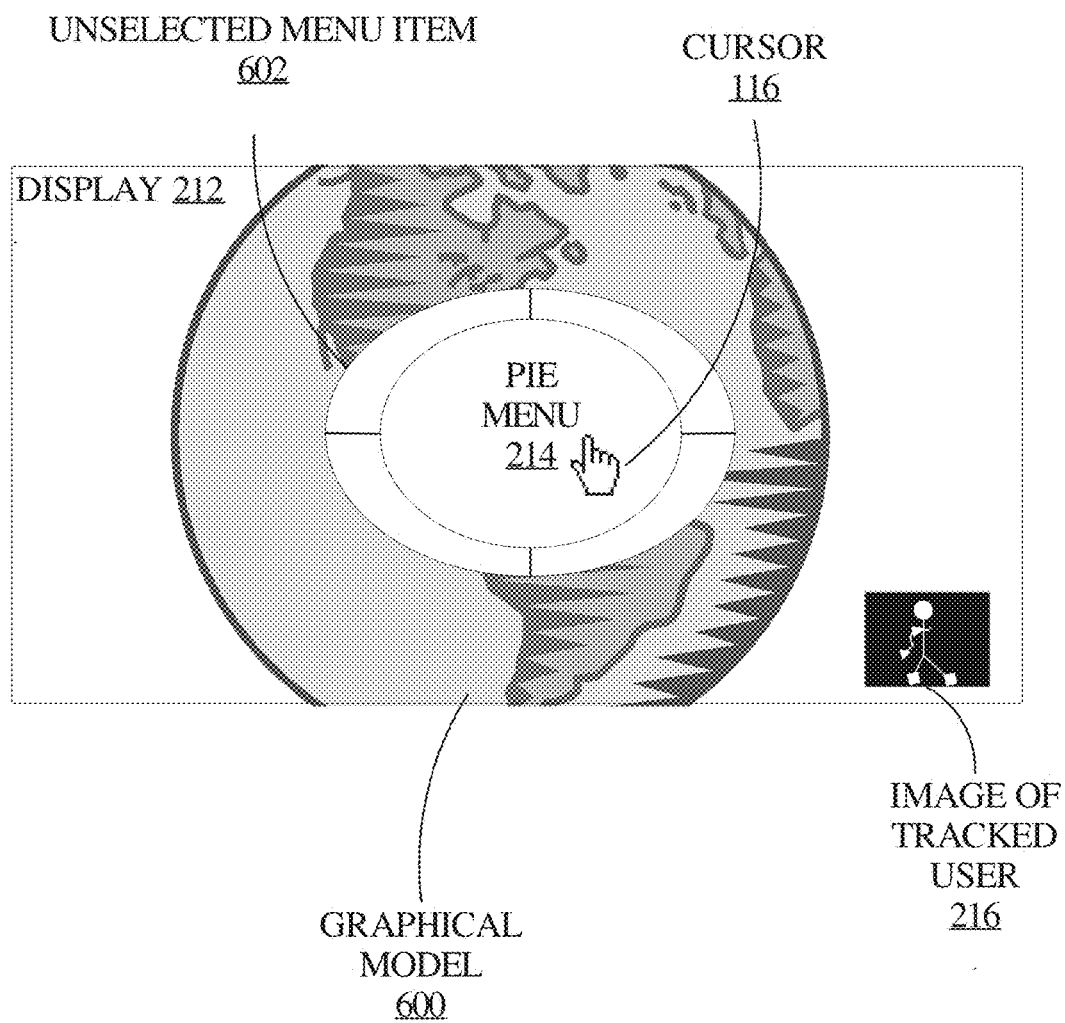

GESTURE MANAGEMENT SYSTEM

BENEFIT CLAIM

This application claims the benefit as a Continuation of Non-Provisional patent application Ser. No. 13/557,100, filed Jul. 24, 2012 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates to managing gesture input.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright ©2012 Palantir Technologies, Inc.

BACKGROUND

Motion controlled systems are equipped with motion sensing input devices that allow a human user to control a virtual object, such as a cursor or character, in a virtual environment or interface through natural movement of the human user. One example motion controlled system is the KINECT® by MICROSOFT®. In a KINECT® system, motion input is captured in three-dimensional space using sensors that detect infrared radiation and sensors that detect visible light. The motion input is transformed into a three-dimensional skeleton of the human user, and the skeleton is periodically updated as the human user moves in a physical environment. Movement of the skeleton may control a cursor or character on the screen such that the cursor or character moves in a manner that roughly corresponds with the movement of the human user in the physical environment.

Unlike mouse input, motion input includes positions of joints or tracked body parts of a human user, optionally in three-dimensional space. These tracked body parts may be in any configuration, moving in any direction, and it is difficult to predict how human users will interact with motion controlled systems.

Due to the complexities of motion input, such input is often mapped directly to the virtual objects that are being controlled by the motion input. For example, a position of a user's hand may be mapped directly to a position of a cursor on the screen. As another example, a configuration of a user's arms and legs may be mapped directly to a configuration of a character's arms and legs on the screen. As a result, functionality of motion controlled systems is quite limited, and simple games such as FRUIT NINJA® or KINECT® Sports have been the most successful applications of these motion controlled systems. In FRUIT NINJA®, for example, the hands of the human user are mapped to hands or blades for slicing fruit in a virtual environment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

The appended claims may serve as a summary of the invention.

BRIEF DESCRIPTION OF THE DRAWINGS

In the drawings:

FIG. 6B illustrates a pie menu overlaid on the example graphical user interface of FIG. 6A in response to gesture input.

DETAILED DESCRIPTION

Figure 1:
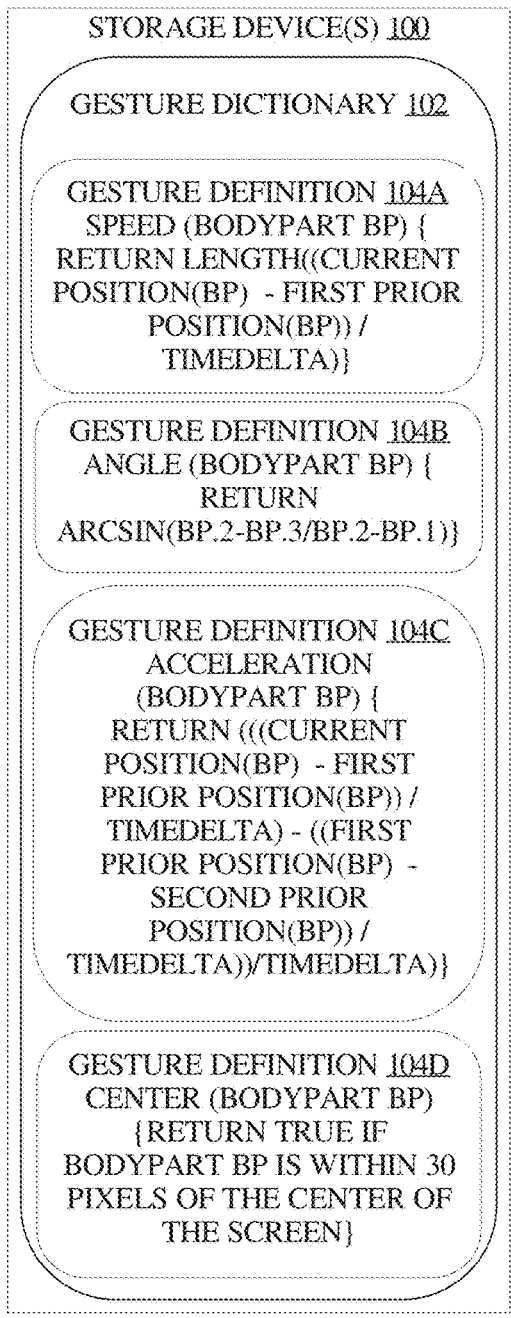
FIG. 1 and FIG. 2 illustrate components of an example gesture recognition system for evaluating an expression that references gesture definitions.
Figure 1:
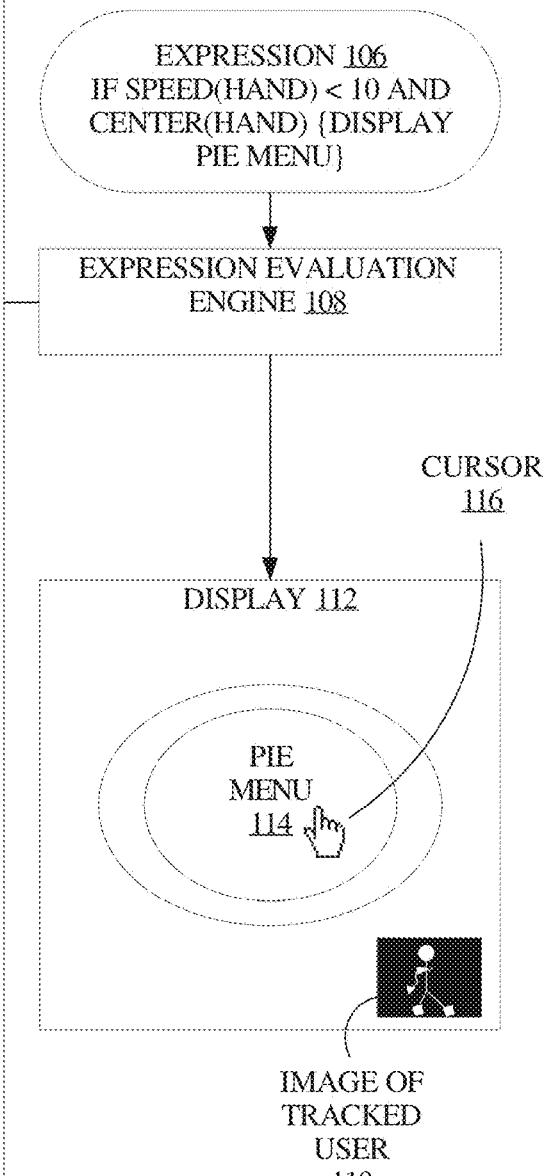

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are disclosed herein for storing gesture definitions and evaluating expressions that reference the gesture definitions. If conditions in the expressions are satisfied, the techniques further include triggering actions associated with corresponding gesture definitions. In one example technique, conditions describing logical combinations of gestures trigger display and navigation of a pie menu. Although the techniques may be described with reference to specific embodiments, the functionality described herein may be provided by the performance of a method, by a set of one or more stored instructions that, when executed, cause performance of the method, or by a set of one or more machines configured with a combination of hardware and software to perform the method. In this description, references in the plural to expressions, conditions, actions and gesture definitions include the singular and plural elements are not required in every embodiment.

In one embodiment, a storage device is configured to store a gesture dictionary that includes gesture definitions. Different gesture definitions may be based on same or different tracked body parts of a user or same or different combinations of tracked body parts of the user. Gesture definitions in the gesture dictionary are accessible to an expression evaluation engine that evaluates expressions to determine whether movements of the user satisfy the expressions. The expression evaluation engine may receive expressions in user or application requests to evaluate the expressions, and the expression evaluation engine may automatically evaluate the expressions when a gesture recognition system receives updated information about tracked body parts of the user. An expression may include a logical operator that relates different conditions to each other, and the different conditions may reference different gestures or other criteria that are based on the tracked body parts of the user. The expression may be satisfied when the logical operator is satisfied.

In one embodiment, the expression evaluation engine tracks which parts of expressions are satisfied based on current and past skeletons. For example, the expression evaluation engine may determine that a first part of the expression has been satisfied by a first set of tracked information about a user, and that a second part of the expression has been satisfied by a second, later set of tracked information about the user. If the expression as a whole is satisfied after the two parts have been satisfied, then the expression evaluation engine may trigger any actions that are associated with the expression. In one example, tracked information about the expressions themselves may be discarded after a threshold time. For example, the expression may be satisfied if gesture A and gesture B occur within 500 milliseconds of each other. If gesture A occurs, the expression evaluation engine may store an indication that gesture A has been satisfied at a particular time. In this example, the skeleton information does not need to be retained after the expression evaluation engine has stored the indication that gesture A was satisfied. If more than 500 milliseconds pass since gesture A has been satisfied, and gesture B was not satisfied within the 500 milliseconds, then the expression evaluation engine may delete the stored indication that gesture A has occurred.

The expression may also specify or otherwise be associated with an action. The expression evaluation engine may trigger the action when the logical operator is satisfied. Based at least in part on the expression, the expression evaluation engine causes the action when the logical operator in the expression is satisfied. Satisfaction of the logical operator is based on a logical combination satisfaction of the different conditions.

In one embodiment, the logical operator is an OR operator, and the logical combination is a Boolean OR or other disjunctive combination. In this embodiment, the logical operator is satisfied if either of the different conditions is satisfied. In another embodiment, the logical operator is an AND operator, and the logical combination is a Boolean AND or other conjunctive combination. In this embodiment, the logical operator is satisfied if both of the different conditions are satisfied. Other logical operators include XOR, NOR, NAND, and XNOR. Logical operators such as A BEFORE B, A AFTER B, or SEQUENCE(A,B) may also specify ordering or sequencing requirements for a combination of gestures. These sequencing operators may be used to describe ordering condition(s) that are placed on the combined gestures.

The gesture definitions may define movement of a tracked part of the user from one location to another location, a rate of motion of a tracked body part of the user, and/or an angle formed by three tracked points of the user. In one example, different gesture definitions are based on the same tracked body part of the user. For example, a first gesture definition may be based on a position of a hand of the user, and a second gesture definition may be based on a rate of motion of the hand. In another example, different gesture definitions are based on different tracked body parts of the user. The different body parts may include different body parts of the same type, such as different hands, or different body parts of different types, such as an elbow and a head.

The tracked parts of the user may be detected using sensor(s) that detect infrared radiation and/or sensor(s) that detect visible light. For example, the KINECT® by MICROSOFT® is one example system for tracking body parts of a user. The KINECT® device includes both infrared sensors and visible light sensors. The tracked parts of the user may also be detected using a touch-screen. For example, different fingers of a user may be tracked on or near a touch screen. A capacitive touch-screen and stylus may be used to track a position of hand of the user when the user is not touching the screen.

The gesture definitions may reference a dictionary of tracked parts of the user. Different gesture definitions, when called by the expression, may cause computations of different values that are based on different tracked body parts of the user. The gesture definitions might not maintain the different values after the gesture definitions have been called by the expression. Unlike the values computed according to the gesture definitions, values indicating the tracked parts of the user are maintained even after the gesture definitions have been called by the expression.

In one embodiment, the triggered action includes causing display of a pie menu. In this embodiment, an expression evaluation engine may receive further input that indicates a hand of the human user has moved in a direction away from a center of the pie menu and, in response, cause display of, highlighting of, and/or otherwise activation of a new menu item in that direction. An activated menu item may be selected based on a gesture such as an opening, closing, or pointing of the hand. In one example, additional menu items appear as the pie menu is navigated outwardly towards a final menu item selection.

In various other embodiments, the triggered actions may include actions that affect or change a graphical user interface or objects that are displayed on the graphical user interface. Other actions may trigger messages to be sent from the motion controlled system to other system(s), or to store or retrieve information from storage device(s). The triggered actions may also change a mode of a gesture recognition system. Different modes of the gesture recognition system may cause evaluation of different types of gestures. For example, a mode related to a pie menu, when activated, may limit evaluation to only those gestures that are related to the pie menu. Some gestures may also be evaluated regardless of the mode of the gesture recognition system.

In one embodiment, an expression evaluation engine detects completion of a gesture comprising a particular series of hand and/or arm motions or a fixed position of a hand held for a threshold amount of time. For example, the series of motions may include an opening up of an arm and a pointing, opening, or closing of the hand. As another example, the hand may be detected in a fixed position at or within a threshold distance of the center of the screen for at least a threshold amount of time. In response to the gesture, the expression evaluation engine displays a pie menu on the screen. The expression evaluation engine then detects hand movement in a particular direction, such as a direction away from the center of the screen. In response to the hand movement, the expression evaluation engine causes navigation of the pie menu in the particular direction. For example, new menu items may be displayed, highlighted, or otherwise activated. An activated menu item may be selected based on a gesture such as an opening, closing, or pointing of the hand. In one example, additional menu items appear as the pie menu is navigated outwardly towards a final menu item selection.

Tracking User Input and Accessing Tracked User Input

A user may interact with a motion controlled system by moving around in a physical environment. For example, a user may interact with a MICROSOFT® KINECT® system for XBOX 360® or WINDOWS® by moving his/her body in front of a television and a KINECT® sensor bar. The sensor bar may be equipped with sensors that detect infrared radiation ("IR") and/or sensors that detect visible light. The depth information captured by the IR sensors and the different perspectives captured by the visible light sensors provide three-dimensional information that describes how the user moves nearer-to-and-further-from the screen, in addition to information about how the user moves side-to-side and up-and-down. The motion controlled system may present, to the user, a visual representation of a skeleton, comprising joints of the user. If the skeleton is in a position that does not correspond with the physical position of the user in the physical environment, then the user may adjust his/her physical position and/or the sensors until his/her physical position corresponds with the position of the skeleton.

The motion controlled system maintains a digital skeleton to provide information about joints or body parts of the user as the user moves. These tracked body parts may be in any configuration and moving in any direction, and the body parts of the skeleton may be at different positions at different times. The motion controlled system may store, in memory or on disk, a series of skeletons such that each skeleton is associated with a different time. For example, the stored series of skeletons may reflect a window of time, such as the latest 5 seconds or the latest 500 milliseconds. Skeleton information may be captured periodically, such as every 2-200 milliseconds (5-500 hertz)—most televisions display information at a rate of 60-120 hertz. The captured skeleton information may be processed serially or in parallel, such that only one or more than one skeleton may be processed at a time. Older skeletons may be overwritten, deleted, or otherwise discarded as newer skeletons are stored. In one example, skeleton objects are stored in a circular buffer of a fixed size. In another example, the skeletons are discarded after they have been used to evaluate gestures that are stored in a gesture dictionary.

Regardless of the data structure used to store the skeletons, the skeletons may be stored in or made part of a library of tracked information about the user. Such information about the user may include characteristics of the user, such as the height or weight of the user, and the information may also identify the user himself/herself, for example, based on facial recognition techniques and the characteristics of the user. The library of tracked information about the user is made available to other applications so these other applications may be controlled based on the movement of the user that is reflected in the skeleton or series of skeletons.

Using the library of tracked information about the user, these other applications may allow the user to control virtual objects, such as cursors or characters, in a virtual environment. The motion input may be mapped directly to the virtual objects that are being controlled by the motion input. For example, a position of a user's hand may be mapped directly to a position of a cursor on the screen. As another example, a configuration of a user's arms and legs may be mapped directly to a configuration of a character's arms and legs on the screen. Alternatively or additionally, the motion input may trigger various gestures when various combinations of the motion input over time satisfy certain conditions.

Other systems may use other combinations of sensors to detect movement in a physical environment. Other systems may use a combination of accelerometers, cameras, IR sensors, step-button pads, heat sensors, and/or weight sensors. Some systems may prompt a user to wear devices such as specialized glasses, specialized gloves, or specialized shoes. Information may be collected by a centralized device, and this centralized device may communicate with other data gathering devices via wired or wireless communications. For example, accelerometer information may be transmitted from a remote control to the centralized device.

Tracked parts of the user, such as the user's fingers, may be detected using a touch-screen instead of or in addition to being detected using sensors that capture movement in a physical environment. For example, different fingers of a user may be tracked on or near a touch screen. A capacitive touch-screen and stylus or specialized glove may be used to track a position of hand of the user when the user is not touching the screen.

The tracked parts of the user may be processed and prepared for application usage before or after they have been recorded in the library of tracked information about the user. The information may be passed through a series of filters including a normalization filter that normalizes a size of the person, and/or a jitter reduction filter that takes a moving average of body part positions to reduce jitter. The normalization filter may scale skeleton data based on one or more of a variety of factors, f, such as arm span, height, or even head size, by multiplying the skeleton data by a value equal to u/f, where "u" is a unit factor that represents a desired size of that factor for the final skeleton. The jitter reduction filter may take a moving average of body parts and ignore movements that would indicate body parts have moved beyond a threshold variance between data collection intervals.

The information about tracked body parts may be stored in a repository and accessed by application(s). Alternatively or additionally, updated information about the tracked body parts may be reported to application(s). The application(s) may determine and record a progress of relevant gestures based on the updated information. Once the application has recorded the progress of the relevant gestures, the application may discard the updated information. Alternatively, the application may retain the updated information for further analysis.

Figure 2:
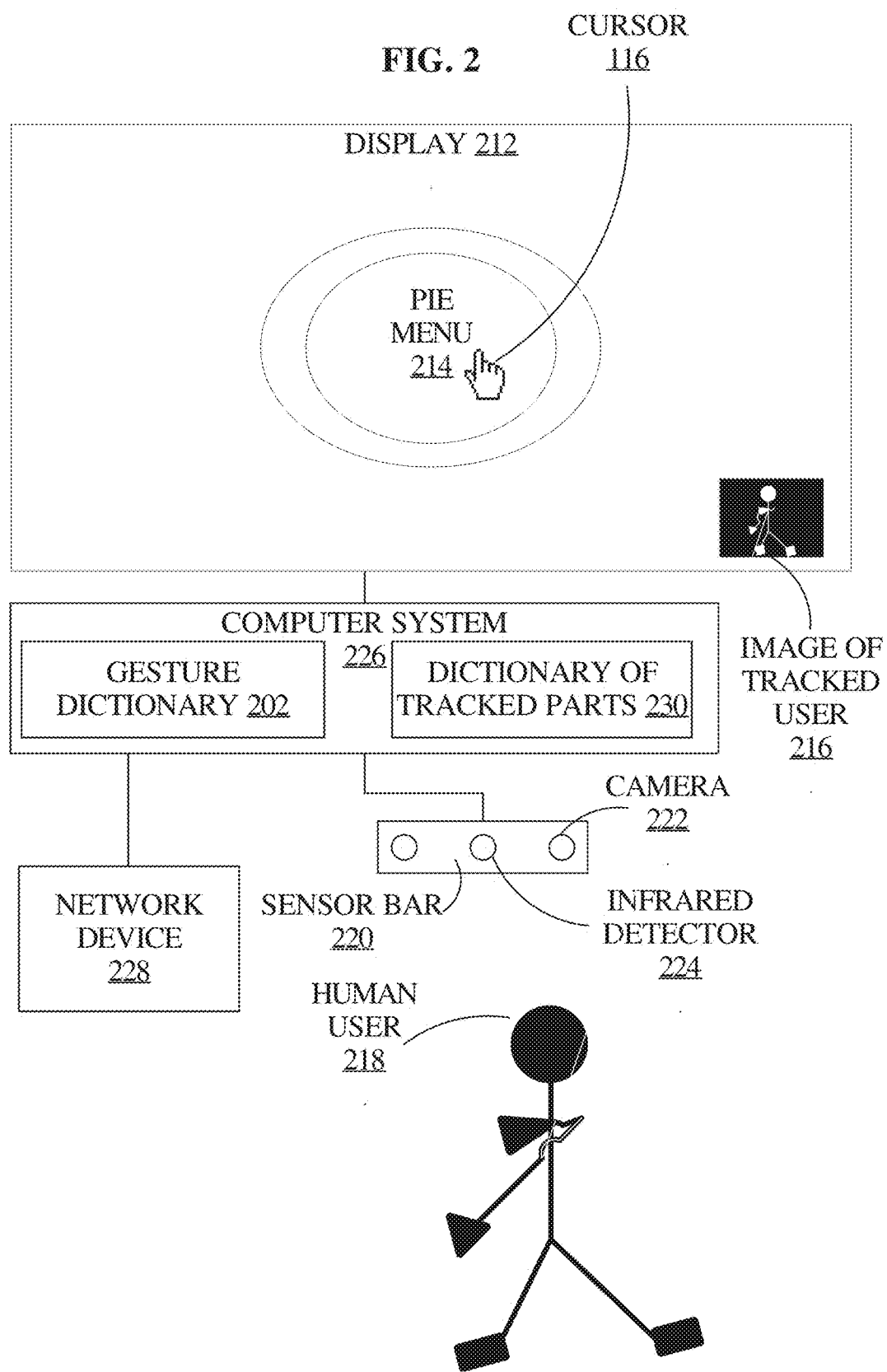

FIG. 1 and FIG. 2 illustrate components of an example gesture recognition system for evaluating an expression that references gesture definitions. The system in FIG. 1 includes storage device(s) 100, expression evaluation engine 108, and display 112. In the example shown, expression evaluation engine 108 is configured to receive an expression 106 that references gestures definitions 104A and 104D that are stored in gesture dictionary 102 on storage device(s) 100. The expression 106 may be received from gesture dictionary 102, or may be provided as part of an application or user request to evaluate whether an expressed gesture has been completed. Expression 106 specifies two conditions, "SPEED(HAND)<10" and "CENTER(HAND)," that are joined by the conjunctive operator, "AND." Expression evaluation engine 108 is configured to be coupled to storage device(s) 100 for retrieving information about referenced gesture definitions 104A and 104D. In response to determining that the conditions are satisfied, expression evaluation engine 108 causes the action specified in expression 106, "DISPLAY PIE MENU." Expression evaluation engine 108 is configured to be coupled to display 112 for causing pie menu 114 to appear on display 112. The display may also include an image of the tracked user 118, which is updated as the user moves around in a physical environment in front of display 112. As shown, the display also includes a cursor icon that may be mapped to a hand of the user.

FIG. 2 additionally shows a computer system 226 that includes the gesture dictionary 202 and dictionary of tracked parts 230. The gesture dictionary stores gesture definitions such as the ones shown in FIG. 1. The dictionary of tracked parts 230 stores updated information about human user 218, as captured via sensor bar 220. Sensor bar 220 includes camera 222 for capturing visual images of user 218. Sensor bar also includes infrared detector 224 for capturing depth information about user 218. Multiple detectors 224s or cameras 222s may be used to capture information about user 218 from different angles. As shown, computer system 226 is also configured to be connected to a network, such as a local area network or a wide area network, via network device 228. Computer system 226 may send and receive messages over the network in support of presenting information to user 218 via display 212.

Figure 3:
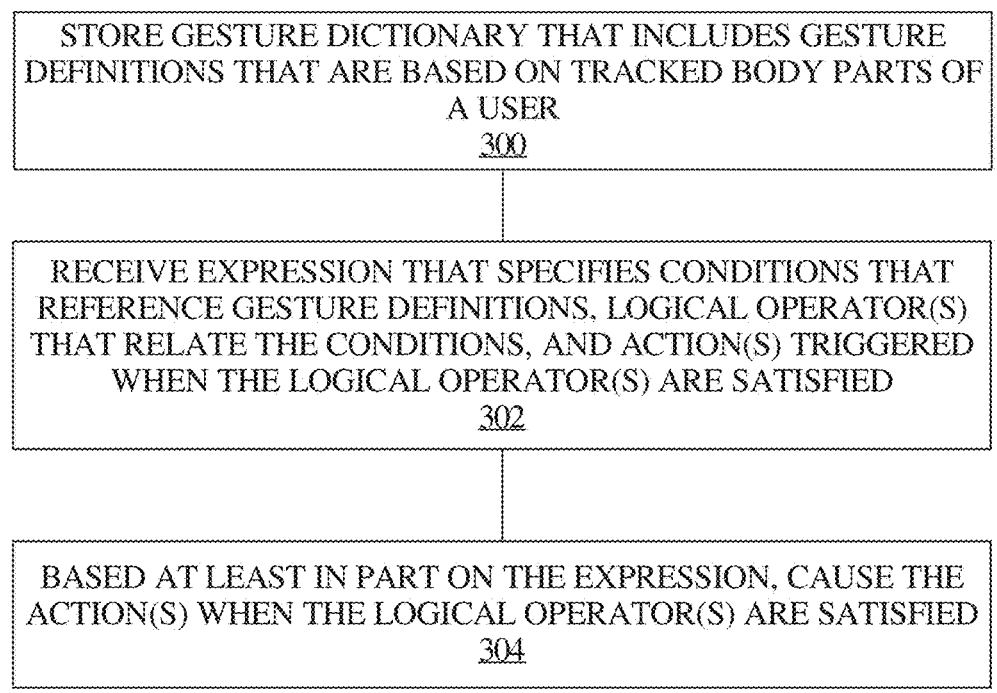
FIG. 3 illustrates an example process for evaluating an expression that references gesture definitions.

FIG. 3 illustrates an example process for evaluating an expression that references gesture definitions. The process may be performed by computing device(s) that are specially configured with gesture recognition logic.

In block 300, the computing device(s) store a gesture dictionary that includes gesture definitions that are based on tracked body parts of a user. In block 302, the computing device(s) then receive an expression that specifies conditions that reference gesture definitions, logical operator(s) that relate the conditions, and action(s) that are triggered when the logical operator(s) are satisfied. For example, the expression may be received from the stored gesture dictionary, or the expression may be received from an application or user that submitted a request to evaluate whether an expressed gesture has been completed.

In block 304, based at least in part on the expression, the computing device(s) cause the action(s) when the logical operator(s) are satisfied. Block 304 may be performed immediately in response to block 302. Alternatively, the computing device(s) may track information about which condition(s) in an expression are satisfied and which condition(s) in the expression are not satisfied. Block 304 may be performed upon determining that all condition(s) in the expression are satisfied, which may not occur immediately after receiving the expression in block 302.

Defining and Accessing Simple and Complex Gestures

In one embodiment, information about tracked body parts is reported to or retrieved by a gesture recognition system. The gesture recognition system includes an expression evaluation engine that determines whether patterns of movement reflected by the tracked body parts satisfy conditions expressed in gesture definitions. The gesture recognition system then triggers actions associated with the gesture definitions when the tracked body parts satisfy the conditions of the gesture definitions.

The gesture recognition system may be an event-based system, where events include updated information about the tracked body parts. The events may satisfy one or more conditions specified in gesture definition(s). The events may also include actions that were triggered by other gestures that were satisfied.

A gesture may specify multiple conditions, and the gesture may be partially satisfied or fully satisfied when some but not all of the multiple conditions are satisfied. Further, the satisfaction of conditions specified in one gesture definition may trigger evaluation of conditions specified in other gesture definitions. For example, a second gesture definition may depend on a first gesture definition if satisfaction of the second gesture definition requires satisfaction of the first gesture definition. For an explicit dependency, the second gesture definition may include a reference to the first gesture definition. For an implicit dependency, an expression evaluation system may discover that satisfaction of the second gesture definition requires satisfaction of the first gesture definition even though the second gesture definition does not reference the first gesture definition. If the second gesture definition depends on the first gesture definition, the second gesture definition does not need to be evaluated until and unless the first gesture definition is satisfied. In this example, satisfaction of the first gesture definition may trigger evaluation of the second gesture definition.

A simple gesture is defined based directly on received information about tracked body parts. For example, a simple gesture may include simple criteria such as a comparison operator that compares a joint position to a threshold value or a calculation of an output value based on joint position(s). For example, a simple gesture may determine the speed of the right hand in meters per second. The example simple gesture may receive information about the position of the right hand over the past second and determine how far the right hand has traveled in the past second. Other simple gestures may include distances between joint positions, angles formed at joints, speeds of joints, orientations of joints. For example, simple gestures may calculate a distance between a hand and a shoulder, an angle formed at a joint, a speed of joints, and/or whether arm is out forward A complex gesture is a non-simple gesture that is defined based at least in part on a logical combination of conditions. Each condition is based on simple gestures, other complex gestures, and/or criteria that have not yet been defined as simple gestures or complex gestures. For example, a complex gesture may evaluate whether the speed of both the right hand and the left hand are greater than one meter per second. The complex gesture may reference a first sub-gesture that evaluates whether the speed of the right hand is greater than one meter per second, and a second sub-gesture that evaluates whether the speed of the left hand is greater than one meter per second. The complex gesture is satisfied when both of the sub-gestures are satisfied. Other complex gestures may include logical operations other than the conjunctive operation, "AND." Other complex gestures may be based on a disjunctive "OR" combination of sub-gestures or some other logical combination of sub-gestures. Other logical operators include XOR, NOR, NAND, and XNOR.

Complex gestures may also include sequencing operators, which are logical operators that, in addition to combining gestures, also specify ordering or sequencing conditions that are placed on the combined gestures. For example, A BEFORE B means that not only must gesture A AND gesture B occur, but gesture A must occur before gesture B. Similarly, A AFTER B means that not only must gesture A AND gesture B occur, but gesture A must occur after gesture B. For this reason, A AFTER B is equivalent to B BEFORE A, and either expression may be substituted for the other. These expressions could also be written as SEQUENCE(B, A), meaning that gesture A must occur after gesture B or that gesture B must occur before gesture A.

Example simple gestures may calculate the distance between two joints, the speed and/or direction that a joint is moving, an angle between three joints, an area covered by four joints, or any other joint-based calculation. These joint-based calculations can then be combined to make more complex criteria by using conjunctions (AND), disjunctions (OR), sequencing operators, and/or other combiners. For example, one complex gesture that evaluates whether the user's hands were held together before the hands were thrown out to the sides could be defined as: "Sequence (with a maximum time of 500 ms between the gestures), Left hand within 10 cm from right hand, Conjunction: Left hand at least 30 cm to the left of left shoulder AND right hand at least 30 cm to the right of right shoulder." The example expression is provided as "Sequence (time between gestures), gesture A, gesture B." In the example, gesture B is also a complex gesture that is based on a conjunction of two sub-conditions.

Complex gestures may be built up in a hierarchy such that, when a gesture is defined, the gesture may be referenced without having to re-define the gesture. For example, a "hold hands together" gesture may be defined as "true if left hand within 10 cm from right hand," and the gesture may be referenced in other gesture(s) that are concerned with whether the user has placed his/her hands together.

Example Gestures include, without limitation, JointsSeperatedGesture, JointsCloseGesture, JointSpeedConstraint, SwipeGesture, JointAngleConstraint, KeyPressGesture and HandClosedGesture.

Example GestureCombiners include, without limitation:
GestureConjunction
GestureDisjunction
Gesture Sequence
GestureActivateDeactivate
GestureTimeout The Conjunction and Disjunction operators function as logical AND and OR conditions, respectively, for the combined gestures.

The Sequence operator is satisfied when the combined gestures occur in an expected sequence. The Sequence operator may also provide a partially completed result if earlier gestures have occurred but later gestures have not yet occurred.

The ActivateDeactivate operator functions as a switch that is activated when a first set of named gesture(s) occur and deactivated when a second set of named gesture(s) occur. Once a gesture from the first set is detected, the switch remains activated until a gesture from the second set is detected. For example, when panning a graph, pan mode is activated when the left hand is straight-out sideways, and deactivated when the left hand is down at the side.

The Timeout operator is activated if a condition is met for a threshold amount of time. For example, GestureTimeout (MainScreen, BothHandsAboveHead, 3 seconds) may display or otherwise maintain a timer counting down 3 seconds when the user raises his/her hands above his/her head. If he/she lowers his/her hands before the 3 seconds are up then Timeout operator will cancel the timer; otherwise, the Timeout operator will activate the gesture and whichever action(s) are associated with the gesture. The Timeout gesture may be used to avoid accidental activations.

Example gestures include, without limitation:
Gesture LeftHandAboveHead=JointSeperatedGesture (Direction.Above, Joint.LeftHand, Joint.Head, 0.05 m, 0.1 m)//left hand must be at least 0.1 m above head to activate, 0.05 m above head to deactivate. The use of two different thresholds (0.1 m and 0.05 m) avoids the gesture flicking between being activated and inactivated when near the threshold.

Gesture RightHandAboveHead= . . .
Gesture BothHandsAboveHead=GestureConjunction (LeftHandAboveHead, RightHandAboveHead)
Gesture BothHeadsBelowHead= . . .
Gesture HandsCloseTogether=JointSeperatedGesture(Direction.VerticalPlane, Joint.LeftHand, Joint.RightHand, 0.3 m, 0.4 m)//measures the distance in the vertical plane
Gesture RaiseBothHandsAboveHead=GestureSequence (1.0 seconds, BothHandsBelowHead, BothHandsAboveHead)
Gesture LowerBothHandsBelowHead=GestureSequence (1.0 seconds, BothHandsAboveHead, BothHandsBelowHead)
Gesture RaiseBothHandsAboveHeadWhileHoldingDownRemote
PresenterButton=GestureConjunction(RaiseBothHandsAboveHead, KeyPress(RemotePresenter.Button1))

Gestures can be shared between multiple combiners, to save computation time. For example RaiseBothHandsAboveHead and LowerBothHandsBelowHead share the constraint BothHandsBelowHead. This constraint may be calculated once per frame or per skeleton data update, even though there are two gestures using the sub-gesture. If two or more complex gestures require completion of the same sub-gesture, then completion of that sub-gesture may trigger evaluation of the two or more complex gestures. Also, once a particular gesture has been evaluated once for a set of updated skeleton data, if the gesture evaluates to either 1 (TRUE) or 0 (FALSE), then, for that set of updated skeleton data, the value for the gesture may be substituted in place of the gesture for all complex gestures that reference the gesture.

Gestures may be organized into gesture libraries, and the gesture libraries may be stored on one or more storage devices that are accessible to an expression evaluation engine that is responsible for evaluating the gestures. The expression evaluation engine may restrict focus down to a specific set of gestures at various times, such as while a particular gesture is activated and deactivated. For example, when a pie menu is open, the expression evaluation engine may evaluate only those gestures that are related to the pie menu. When the pie menu is closed, the expression evaluation engine may resume evaluating those gestures that are not related to the pie menu. Restricting focus would prevent the user from accidentally activating other gestures in the background (e.g. pan graph, delete node etc.).

In one embodiment, a gesture recognition system triggers evaluation of gestures periodically, by an expression evaluation engine, automatically in response to updates of information about tracked body parts of the user. The expression evaluation engine receives a gesture for evaluation and, in response, determines whether the gesture is satisfied or not satisfied. If satisfied, the expression evaluation engine or other action triggering logic may trigger action(s) associated with the gesture. In another embodiment, the expression evaluation engine receives gesture(s) from an application or user and, in response and on demand, evaluates the gesture(s) to determine whether or not the gesture(s) are satisfied. If satisfied, the expression evaluation engine or other action triggering logic may trigger action(s) associated with the gesture.

If the gesture is partially satisfied, the expression evaluation engine may store information that indicates the gesture has been partially satisfied. For example, the expression evaluation engine may store an indication that a sub-gesture was satisfied at a particular time. The expression evaluation engine may expire or discard this stored indication when the stored indication is no longer relevant to any gestures, for example, after a timeout period.

When a gesture is satisfied, the expression evaluation engine may check other gestures that depend on the satisfied gesture. The expression evaluation engine may update these other gestures to indicate that that the satisfied portion has been completed. The expression evaluation engine may also evaluate whether other portions of these dependent gestures have been completed.

Figure 4:
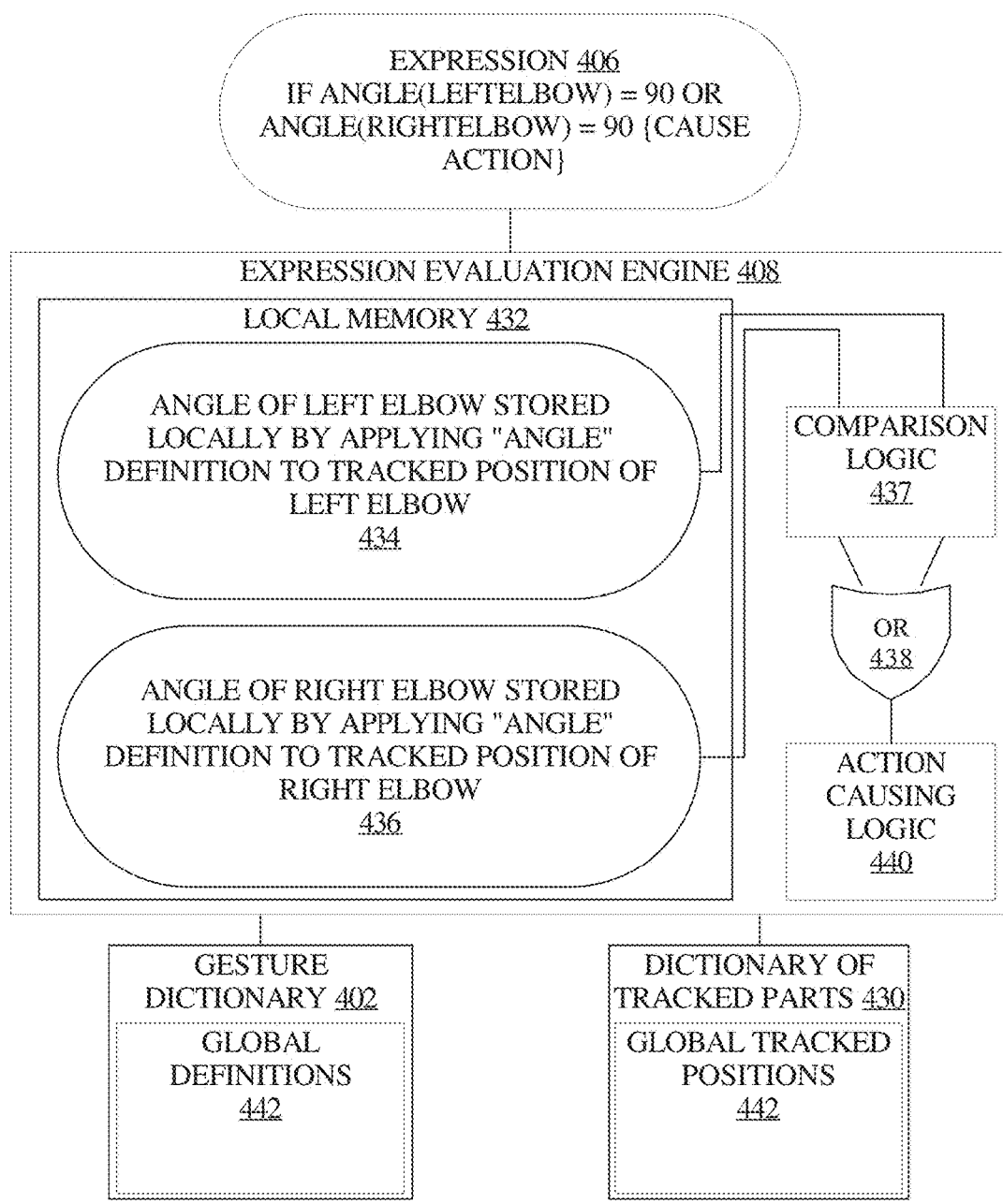
FIG. 4 illustrates an example expression evaluation engine for evaluating an expression that references gesture definitions.

FIG. 4 illustrates an example expression evaluation engine for evaluating an expression that references gesture definitions. Expression evaluation engine 408 receives an example expression 406, which references an angle gesture definition for calculating an angle based on tracked positions of joints. In local memory 432, expression evaluation engine 408 materializes the angle of the left elbow 434 and the angle of the right elbow 436 into resulting values, by applying global definitions 442 from gesture dictionary 402 to global tracked positions 442 from dictionary of tracked parts 430. For example, expression evaluation engine 408 may use global definitions to determine that computing an angle of the left elbow involves determining an angle formed by a left shoulder, a left elbow, and a left hand. Expression evaluation engine 408 may then retrieve the position of the left shoulder, the left elbow, and the left hand from global tracked positions 442. Comparison logic 437 compares these resulting values to the threshold values of 90 and 90, as specified in expression 406. For each of the comparisons, the result from comparison logic 437 is either TRUE or FALSE. The results from comparison logic 437 are OR'd using OR logic 438, and, if the result is true, action causing logic 440 causes an action associated with expression 406. For example, the action may be specified in expression 406, as shown, or the action may be stored in relation to expression 406 in a database.

Providing Gesture Feedback for Partially Completed Gestures

In one embodiment, the gesture recognition system causes display of progress information for partially completed gestures. For a complex gesture that includes multiple sub-gestures or other sub-parts, the gesture recognition system may cause display of icons or other graphical representations associated with the sub-parts as the sub-parts are completed. Such information may be displayed, for example, near an image of the user. For example, if a complex gesture requires completion of sub-gestures A, B, and C, the gesture recognition system may cause display of an icon A once gesture A is completed, an icon B once gesture B is completed, and an icon C once gesture C is completed. The gesture recognition system may also cause display of a graphical indication that the complex gesture has been completed. For example, the gesture recognition system may circle or otherwise encompass or highlight icons A, B, and C to indicate that the sub-gestures have been completed to form a complex gesture. The graphical indications may be displayed in real-time as the complex gesture is being performed. If the complex gesture is not completed, the graphical indications may disappear or become grayed or transparent.

If the complex gesture is a sequence of gestures, then icons or a status bar may indicate how much of the sequence has been completed. For example, a status bar may indicate that the complex gesture is 25% complete when one of four sub-parts of the complex gesture have been completed. The status bar may move to 50% complete in real-time when another of the sub-parts is completed. If the complex gesture is not completed, then the status bar may disappear or return to 0%.

In one embodiment, completion of one sub-part of a gesture may cause display of graphical representations for all sub-parts of the gesture. The graphical representations corresponding to the completed sub-parts may be highlighted or colored, and the graphical representations corresponding to the yet-to-be completed sub-parts may be displayed partially transparent or grayed.

Displaying a status of partially completed gestures may allow the user to quickly debug, tweak and perfect gestures. The user may also discover which sub-parts of complex gestures are not being completed and which complex gestures are being triggered. Gesture definitions may be modified, by adjusting threshold values in conditions, while the gesture recognition system is operating. The gesture definitions may be displayed on the screen such that the user does not need to modify source code such as Java code in order to effectuate changes to the gesture definitions.

Activating Gestures to Control a Pie Menu

In one embodiment, an application is controlled using gestures. A first set of gestures may define different modes for controlling the application. In a default mode, gesture input controls a graphical model or graphical objects on the screen. For example, a user waving hands to the right may trigger rotation of a globe to the right or panning of a surface to the right, and the user waving hands to the left may trigger rotation of the globe to the left or panning of the surface to the left. As another example, movement of the user may trigger a corresponding movement of a character on the screen. The default mode may be sensitive to a limited number of gestures, including gestures for switching into other modes.

Function-driven modes are sensitive to gestures related to a particular function. Function-driven modes are also sensitive to gestures for switching into other modes such as the default mode. Once a gesture has triggered a function-driven mode, many of the gestures associated with other modes such as the default mode may be disabled. Gestures related to the particular function are enabled while the function-driven mode is activated. For example, a user may trigger a function-driven mode for a pie menu when the user completes a gesture to cause display of the pie menu. A pie menu includes different menu items arranged in different concentric rings around the center of the pie menu. The menu may be navigated outwardly from the center to a menu item.

Display of an example pie menu is triggered when the user holds his/her hand within a threshold distance of the center of the screen for a threshold amount of time. Triggering display of the pie menu and the corresponding function-driven mode may disable gestures related to controlling graphical objects on the screen behind the pie menu. In the function-driven mode, the user may control the pie menu by moving his/her hand in a given direction. Such movement causes navigation of the pie menu in the given direction. For example, the pie menu may expand to show menu items on the right side if the user moves his hand to the right such that the menu item closest to the cursor is highlighted. Movement of the user's hands may also trigger activation or selection of a menu item.

In one embodiment, a selection gesture, such as a pointing or an opening or closing of the user's hand, triggers selection of a menu item. The selection gesture may also include, if cursor movement is mapped to the hand, movement of the cursor beyond a threshold distance outside of the pie menu in a particular direction. This selection gesture may trigger selection of the menu item in the particular direction. Selection of a menu item may cause the menu to close and, optionally, a new sub-menu to open. Selection of the menu item may alternatively trigger other actions or other function-driven modes.

A user may navigate several menus to reach a menu item of interest. For frequently accessed menu items that are deep in the menu tree, experienced users may learn different motions that can be used to reach the menu item. The menu items themselves serve merely as reminders of which direction to swipe or wave in order to reach the menu item of interest. For example, a user may swipe left, then right, then up, then down to select the save option.

Figure 6A:
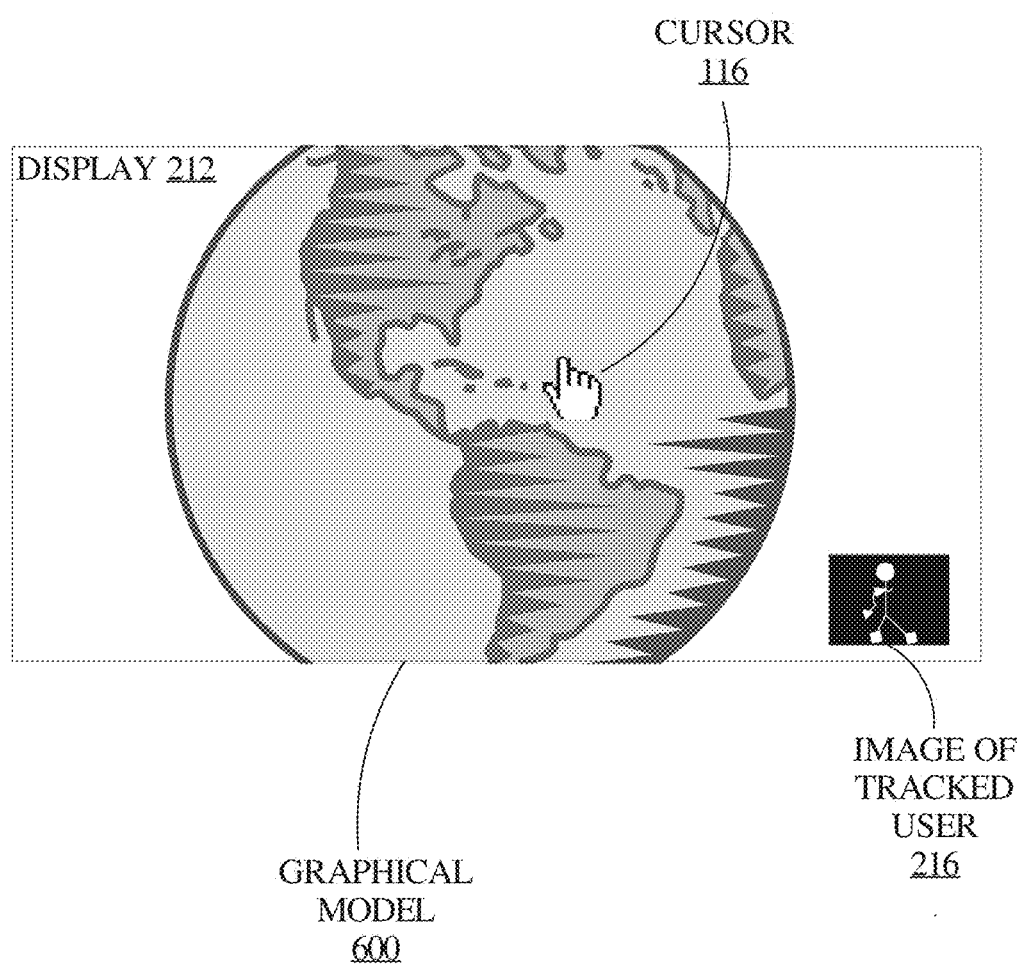
FIG. 6A illustrates an example graphical user interface.

FIG. 6A illustrates an example graphical user interface presented on display 212. Optionally, the interface includes an image of a tracked user 216. As the user moves in a physical environment, cursor 116 moves around in a corresponding manner on display 212. For example, movement of the user's right hand may be mapped to movement of cursor 116. The user may pan or rotate graphical model 600 by swiping his/her hand in different directions. The user may trigger display of a pie menu by holding his/her hand up such that the cursor is in the center of display 212 for at least a threshold amount of time. In response to this gesture input from the user, as shown in FIG. 6B, the system displays a pie menu overlaid on the example graphical user interface of FIG. 6A. As shown, the pie menu includes unselected menu item 602 in an upper left region of an outer ring.

Figure 6C:
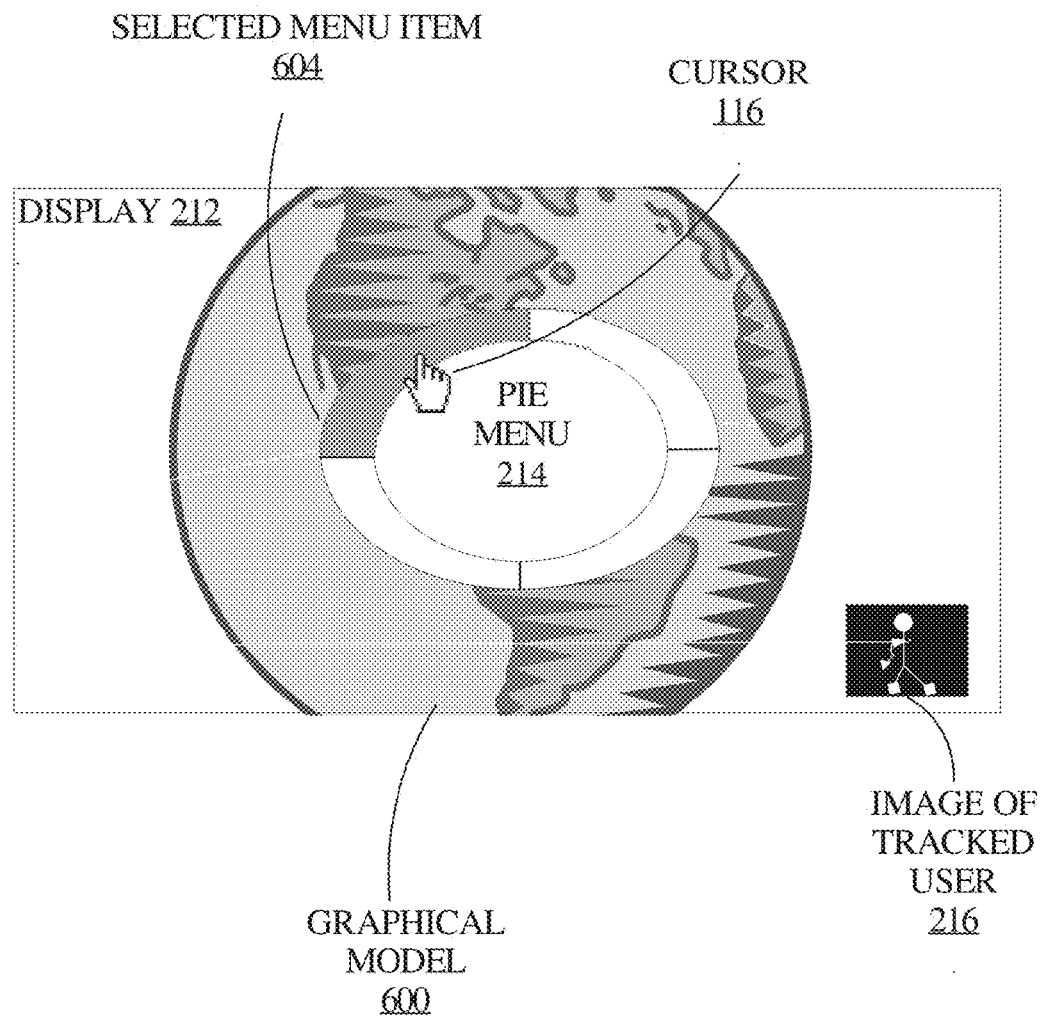
FIG. 6C illustrates navigation of the example pie menu of FIG. 6B in response to gesture input.

The user may navigate the pie menu by moving his/her hand in a particular direction such that the cursor moves in the particular direction away from the center of display 212. For example, the user may move his/her hand up and to the left such that the cursor moves over the upper left region of the outer ring of pie menu 214. As the cursor moves over this region, a previously unselected menu item 602 corresponding to the upper left outer ring becomes activated. Activation of menu items may cause display of new menu items in a new outer ring, may cause highlighting of the menu item, as shown in FIG. 6C, and/or may cause selection of the menu item, as shown by selected menu item 604 of FIG. 6C. Alternatively, the user may perform an additional gesture to select the menu item, such as by moving his/her hand beyond a threshold distance from the boundaries of pie menu 214 in the upper left direction. In another example, the user may select a menu item by opening his/her hand, closing his/her hand, or pointing when the cursor is over the menu item.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
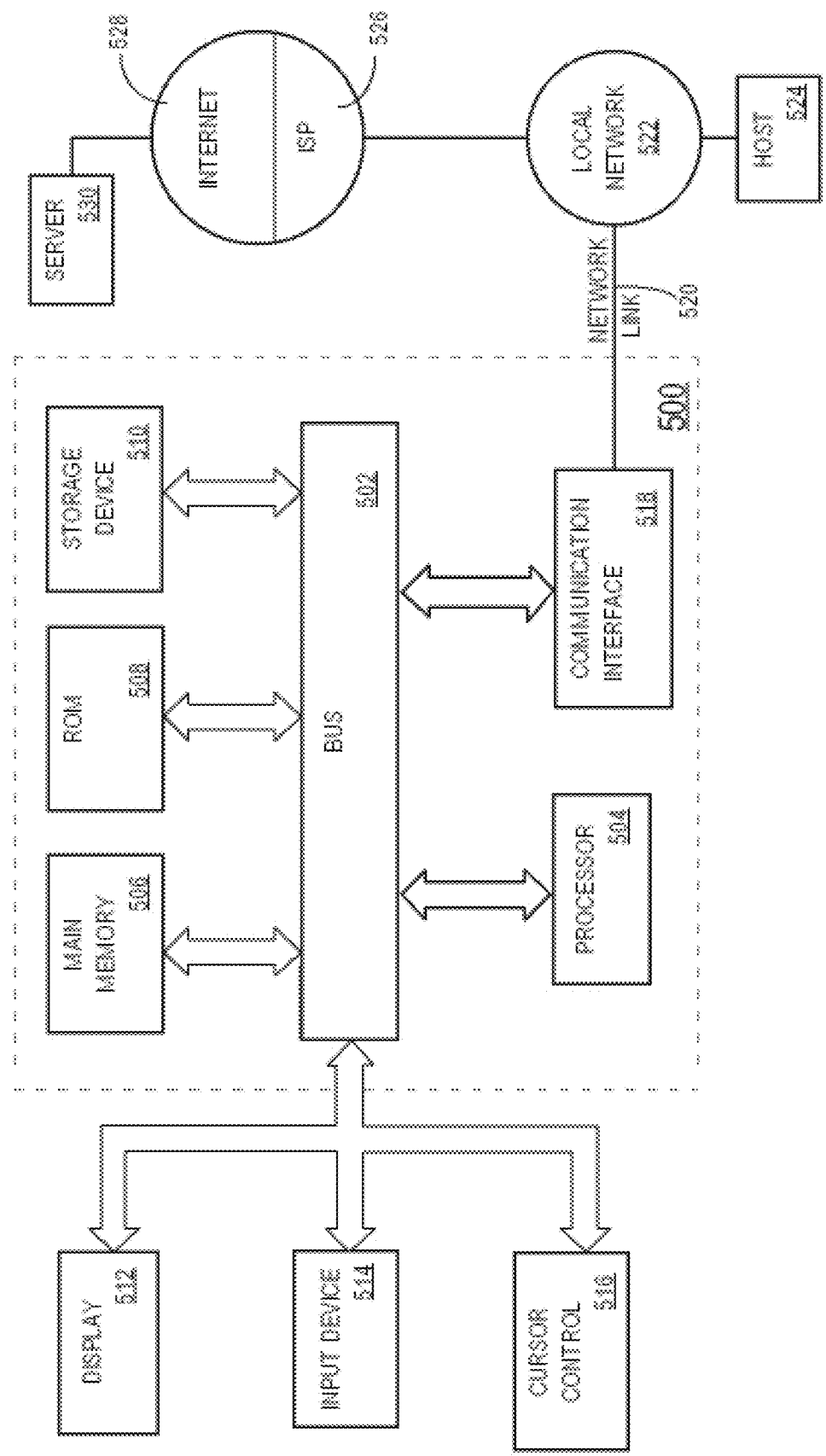
FIG. 5 illustrates an example computer system that may be configured to implement various embodiments described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

As used herein, the terms "first," "second," and "particular" are used as naming conventions to distinguish different processes, computations, inputs, gesture definitions, conditions, tracked body parts, values, expressions, interfaces, devices, or other entities from each other, so that these different entities may be referenced after they have been introduced. The use of these terms does not imply an ordering or timing.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving a first input defining a first gesture definition as a condition regarding a first tracked body part;
    storing the first gesture definition in the gesture dictionary;
    receiving a second input defining a second gesture definition as a condition regarding a second tracked body part;
    storing the second gesture definition in the gesture dictionary;
    receiving a third input defining a third gesture definition as a condition regarding a third tracked body part;
    storing the third gesture definition in the gesture dictionary;
    receiving a fourth input defining a fourth gesture definition as a condition regarding a fourth tracked body part;
    storing the fourth gesture definition in the gesture dictionary;
    receiving, as definition input, a first reference to a first gesture definition that is defined in a gesture dictionary, a second reference to a second gesture definition defined in the gesture dictionary, and a first operator;
    wherein the first input defines the first gesture definition as a third reference to the third gesture definition that is defined in the gesture dictionary, a fourth reference to the fourth gesture definition defined in the gesture dictionary, and a second operator;
    based on said definition input, storing a complex gesture definition as a combination of the first gesture definition, the second gesture definition, and the first operator;
    receiving, in an application program that is controlled using gestures as a form of user input, an action to execute in the application program;
    causing the action to be triggered in said application program in response to user input satisfying the complex gesture definition;
    wherein the method is performed on one or more computing devices.

2. The method of claim 1, wherein the first operator is selected from a group consisting of a sequence operators and Boolean operators.

3. The method of claim 1, wherein the first operator is a first occurrence of a particular sequence operator, and the second operator is a second occurrence of the same particular sequence operator causing the action to be triggered in said application program only in response to user input satisfying the third gesture definition, the fourth gesture definition, and then the second gesture definition in that sequence.

4. The method of claim 1, wherein said application program is implemented in conjunction with skeletal tracking software and hardware that processes user input as a plurality of tracked body parts.

5. One or more non-transitory computer-readable media storing instructions which, when executed by one or more processors, cause performance of:
   receiving a first input defining a first gesture definition as a condition regarding a first tracked body part;
   storing the first gesture definition in the gesture dictionary;
   receiving a second input defining a second gesture definition as a condition regarding a second tracked body part;
   storing the second gesture definition in the gesture dictionary;
   receiving a third input defining a third gesture definition as a condition regarding a third tracked body part;
   storing the third gesture definition in the gesture dictionary;
   receiving a fourth input defining a fourth gesture definition as a condition regarding a fourth tracked body part;
   storing the fourth gesture definition in the gesture dictionary;
   receiving, as definition input, a first reference to a first gesture definition that is defined in a gesture dictionary, a second reference to a second gesture definition defined in the gesture dictionary, and a first operator;
   wherein the first input defines the first gesture definition as a third reference to the third gesture definition that is defined in the gesture dictionary, a fourth reference to the fourth gesture definition defined in the gesture dictionary, and a second operator;
   based on said definition input, storing a complex gesture definition as a combination of the first gesture definition, the second gesture definition, and the first operator;
   receiving, in an application program that is controlled using gestures as a form of user input, an action to execute in the application program; and
   causing the action to be triggered in said application program in response to user input satisfying the complex gesture definition.

6. The one or more non-transitory computer-readable media of claim 5, wherein the first operator is selected from a group consisting of a sequence operators and Boolean operators.

7. The one or more non-transitory computer-readable media of claim 5, wherein the first operator is a first occurrence of a particular sequence operator, and the second operator is a second occurrence of the same particular sequence operator causing the action to be triggered in said application program only in response to user input satisfying the third gesture definition, the fourth gesture definition, and then the second gesture definition in that sequence.

8. The one or more non-transitory computer-readable media of claim 5, wherein said application program is implemented in conjunction with skeletal tracking software and hardware that processes user input as a plurality of tracked body parts.

9. A gesture management system, comprising:
   one or more hardware processors;
   one or more non-transitory computer-readable data storage media storing sequences of instructions which, when executed using the one or more hardware processors, cause the one or more hardware processors to:
   receiving a first input defining a first gesture definition as a condition regarding a first tracked body part;
   storing the first gesture definition in the gesture dictionary;
   receiving a second input defining a second gesture definition as a condition regarding a second tracked body part;
   storing the second gesture definition in the gesture dictionary;
   receiving a third input defining a third gesture definition as a condition regarding a third tracked body part;
   storing the third gesture definition in the gesture dictionary;
   receiving a fourth input defining a fourth gesture definition as a condition regarding a fourth tracked body part;
   storing the fourth gesture definition in the gesture dictionary;
   receive, as definition input, a first reference to a first gesture definition that is defined in a gesture dictionary, a second reference to a second gesture definition defined in the gesture dictionary, and a first operator;
   wherein the first input defines the first gesture definition as a third reference to the third gesture definition that is defined in the gesture dictionary, a fourth reference to the fourth gesture definition defined in the gesture dictionary, and a second operator;
   based on said definition input, store a complex gesture definition as a combination of the first gesture definition, the second gesture definition, and the first operator;
   receive, in an application program that is controlled using gestures as a form of user input, an action to execute in the application program; and
   cause the action to be triggered in said application program in response to user input satisfying the complex gesture definition.

10. The gesture management system of claim 9, wherein the first operator is selected from a group consisting of a sequence operators and Boolean operators.

11. The gesture management system of claim 9, wherein the first operator is a first occurrence of a particular sequence operator, and the second operator is a second occurrence of the same particular sequence operator causing the action to be triggered in said application program only in response to user input satisfying the third gesture definition, the fourth gesture definition, and then the second gesture definition in that sequence.

* * * * *